Dec. 20, 1966   D. A. CLARK   3,292,562
COULTER-KNIFE BLADE ASSEMBLY

Filed July 9, 1965   2 Sheets-Sheet 1

INVENTOR.
DAVID A. CLARK

BY

ATTORNEY

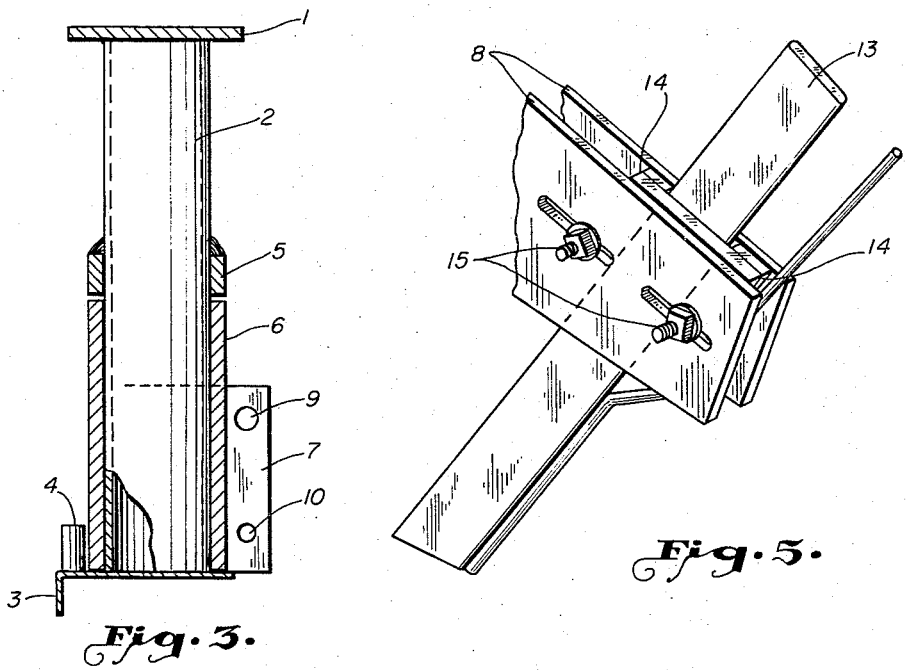
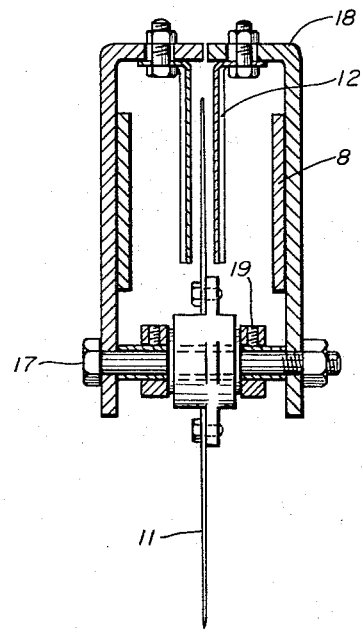

United States Patent Office 3,292,562
Patented Dec. 20, 1966

3,292,562
COULTER-KNIFE BLADE ASSEMBLY
David A. Clark, 1228 Forest Drive,
Sand Springs, Okla. 74063
Filed July 9, 1965, Ser. No. 470,775
7 Claims. (Cl. 111—7)

This invention relates to a new and improved coulter-knife blade assembly which has novel features incorporated therein useful for the application of agricultural fertilizers into the soil. This coulter-knife blade assembly is used in combination with a tool bar clamp which is that part of the framing and structure supporting the supply tank of liquid and gaseous fertilizer.

A review of the prior art discloses one type of a unit which deals with the problem of applying fertilizer is a coulter-knife blade assembly equipped with a spring attachment. This spring-loaded type of coulter-knife blade assembly permits free vertical movement of the assembly allowing the coulter-knife blade assembly to freely raise and lower. The direction of the motion of the assembly would depend on the texture of the soil as the fertilizing equipment passes over the terrain. The principal disadvantage in using this type of coulter is, if the coulter strikes a hard section of soil, the entire structure, including the tube which feeds the gaseous or liquid fertilizer into the ground is raised out of the ground. This releases fertilizer into the atmosphere instead of placing it into the ground. This is a decided disadvantage since much of the fertilizing material is wasted in using this type of coulter-knife blade assembly. Still another disadvantage is that due to the pressure of the spring bearing on the spring-loaded coulters, at times it goes too deeply into the ground when the ground texture is soft. This results in improper feeding of the ground at other than the desirable level.

There are other types of units which use a solid steel member which vetrically extends down from the tool bar and connects directly to the support structure making the coulter-knife blade assembly completely rigid. However, these units do not have any safety protecting device to prevent damage when striking hard objetcs. This results in the equipment being bent out of shape and disabled. The various defective features which have been described above are not present in my invention.

The object of this invention is to provide a means for preventing damage to a coulter-knife blade assembly when the coulter strikes a hard object in the ground surface and to maintain the proper pre-set level of fertilizing in the ground.

Another object of this invention is to provide a coulter assembly including swivel means attachably mounted to the tool bar clamp useful for mounting the coulter assembly.

Another object of this invention is to provide adjustable means for aligning the coulter and the knife-blade, including adjustable scraper means for removing excessive earth from the surface of the coulter.

And still another feature of this coulter assembly is the horizontal and vertical adjustable knife-blade in the assembly.

The features which will be set forth in my invention combine a pre-set level of applying fertilizers in the soil and yet give protection against destruction of the equipment by incorporating a shear bolt in the structure which is sufficiently strong to allow ideal operation of the coulter-knife blade assembly and yet will shear when the coulter-knife assembly strikes an immovable object. The incorporation of this new feature prevents damage to the equipment.

The preferred embodiment of this invention includes plates and bolts for attaching the coulter-knife blade assembly to the tool bar assembly. However, other means for attaching the coulter-knife assembly, such as attaching to a diamond bar by using an inverted W are considered within the scope of this invention. This can be used in place of the plates and bolts as shown in FIGURE 1. Other types of similar attaching means are considered to be within the scope of this invention.

FIGURE 3 illustrates a sectional view of the coulter-knife blade assembly showing the tubular section of the vertical spindle attaching the coulter-knife blade assembly to the tool bar clamp.

FIGURE 4 illustrates a sectional view of the scrapers which are used in conjunction with the coulter blade.

FIGURE 5 illustrates a sectional view of the guides which set the knife blade either up or down, forward or backward.

Figure 1:
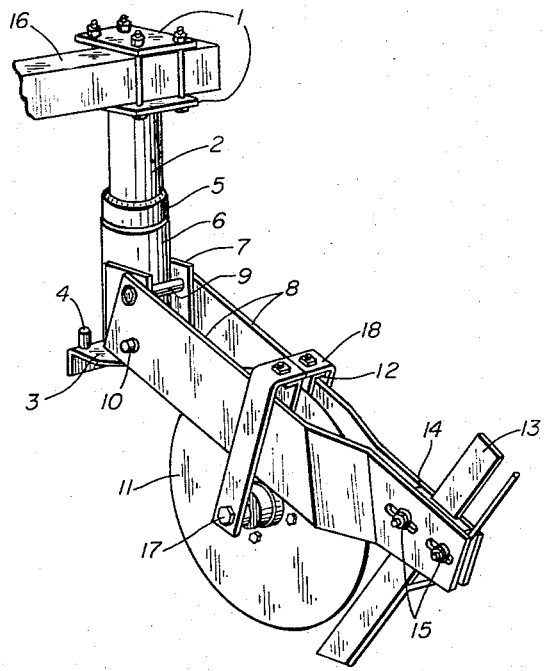
FIGURE 1 illustrates the complete coulter-knife blade assembly attached to a tool bar clamp.
Figure 2:
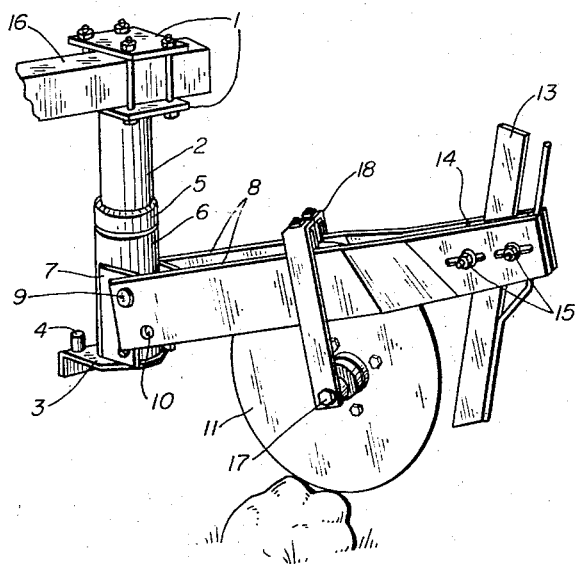
FIGURE 2 illustrates the coulter-knife blade assembly in a hinged position with the shear bolt lock in a tripped position.

Referring now to FIGURE 1, the coulter-knife blade assembly consists of the following components: two steel plates 1, complete with bolts for attaching to a tool bar; directly under the above-mentioned steel plate 1 as illustrated and attached to a bearing plate 3 is one end of a section of mild structural steel tubing 2 while the other end of the mild steel tubular section is attached to the steel plate 1. Steel plate 3 is equipped with two stops 4, one on each forward corner of the plate. Fitted directly over the tubular section 2 and under a ring 5 welded to the first tubular section is a second tubular section 6. This section 6 is positioned so as to rotate freely around the first section 2. Attached to section 6 by means of flange plates 7 is the supporting frame 8 for the coulter and knife blade. The support frame is attached to the flanges 7 by two shear bolts and a pivot pin 9. The upper pivot pin 9 passes through plate 7 as shown in FIGURE 1 and is welded to the support frame 8. Sufficient clearance is allowed in plates 7 so that the supporting frame 8 can rise vertically, the pivot pin 9 acting as a hinge for the support frame 8. To make the support frame rigidly attached to the flanges 7, two bolts 10 which I shall call shear bolts are placed through both the flange sections 7 and the supporting frame 8. The purpose of the shear bolts is two-fold-first, to rigidly attached the support framing 8 to the flanges 7 and the tubular section 6, and secondly, to be a safety device which shears and allows the coulter-knife blade assembly to rise freely in case the coulter or knife strikes a hard object in the structure of the ground. From the tubular structure, the support framing 8 extends backwardly forming an obtuse angle with the tubular section 2. The angle at which the support framing 8 is in relationship to the tubular section 2 is not critical as this angle can be altered for ideal operation of the coulter-knife blade assembly to allow for fertilizing at an ideal level. The main support framing should be sufficiently high enough so that the coulter can roll trash down rather than push it with the front of the frame. Attached to the support framing 8 is an axle support member 18 in the form of a U-shaped plate. This axle support member is welded to the support assembly 8 and furnishes support for the coulter 11 and the scraper blades 12 as shown in FIGURE 1. The upper part of the axle support member also is fitted with two bolts for adjusting the angle of incidence with the coulter-blade surface. The lower side members of the axle support member have means for inserting the axle upon which the coulter rotates in a ball-bearing assembly. This ball-bearing assembly has a set collar adjustment 19 on both sides for easy centering of the coulter-blade in alignment with the knife blade 13 which moves in channel equipped holders 14. The main assembly support framing plates 8 which are spaced with sufficient clearance to prevent trash accumulating in the framing extend with a slight bend inwardly as shown in FIGURE 1 to form substantially parallel flat members with adjustable slots for mounting the channel equipped holders 14. Mounted between the channel equipped holders 14 is the metal knife blade 13 which has previously been hard-surfaced. Tubing for carrying the fertilizer is welded on the back side. The metal knife blade supports or holders 14 are constructed with a channel on the inside face for the knife blade so that the knife blade can move up and down easily. The positioning of the knife 13 in relation to the coulter 11 is possible through adjustable bolts 15.

The novel features of this coulter-knife blade assembly are numerous. The tubular section with the swivel action affords movement of the coulter-knife blade assembly when the fertilizing unit is moving from one line of operation into another direction. This feature in combination with the other new features in this invention are unique in fertilizing equipment. The feature showing the hinged assembly of attaching the main support assembly for the coulter-knife blade assembly is novel and permits the assembly to raise out of the ground when hard areas are encountered. This feature prevents damage to the coulter-knife blade assembly. The main support structure itself is improved having larger clearances between the coulter itself and the sides of the main support structure. The assembly means which supports the scraping blades for removing excessive dirt is unique and prevents build-up on the coulter itself. The means for aligning the coulter and the knife described in the preceding paragraphs increases the efficiency of the unit and improves the effective application of the fertilizer being distributed into the soil.

*Operation and adjustment of the coulter-knife blade assembly*

To attach the coulter-knife blade assembly to the tool bar 16, simply loosen the bolts holding the plates 1, slip the plate assembly over the tool bar and tighten sufficiently to secure the apparatus tightly. To adjust the scraper blades 12 loosen the nuts on the top side of the axle support means 9 and adjust the angle to a suitable clearance between the scrapers and the coulter blade so that the scrapers diverge toward the rear of the coulter blade. See FIGURE 4. The bottom of the knife should be directly aligned with the coulter and should correspond with the lower edge of the coulter so as to feed the fertilizer at the depth at which the coulter is cutting. However, should the operator wish to change the depth of fertilizing, the adjustable means will provide such an adjustment. Adjustments are made by moving the knife up or down, forward or backward after the bolts 15 are loosened. The bolts should be tightened securely after the proper adjustments are made. The coulter-knife blade assembly is now ready for use.

Another of the advantages which are offered by my invention is the ability to work through heavy trash areas. Heretofore, with the standard asesmbly now in use, it has been difficult to work through an area containing heavy trash. Tests have also proven that approximately only one-half the horsepower requirements of the standard assemblies now in use are required to operate my coulter-knife blade assembly. Still another advantage is the exceptional versatility in hill-side application of liquid or gaseous fertilizers. Standard machinery tends to drift downward while the coulter-knife blade assembly disclosed remains in place. The reason that such an outstanding operation has been noted in this type of fertilization is due to the swivel-caster action which has been fully described in the previous paragraphs.

Another improvement noteworthy is the arrangement of the knife-blade guide. With this innovation, the movement of the knife blade is prevented from swinging rearwardly. This affords a precise adjustment between the coulter and the leading edge of the knife blade which will remain constant. This avoids a repeated adjusting of the knife blade.

Various embodiments of this invention in addition to what has been illustrated and described can be employed without departing from the scope of the accompanying claims.

I claim:

1. A coulter-knife blade assembly for applying liquid or gaseous fertilizer into soil comprising a coulter, a knife blade, a tubular swivel, a plate frame consisting of two substantially parallel plates attached to the said tubular swivel by a pivot and a shearing bolt, a U-shaped support member for a spindle, the said coulter being rotatably mounted on the spindle under the said U-shaped support member attached to the said frame, the said plate frame extending forwardly, attaching to the said tubular swivel and rearwardly to support the knife blade, means to attach the coulter-knife assembly to a tool bar attached to the top end of the tubular swivel.

2. A coulter-knife blade assembly as shown in claim 1 where the knife blade is mounted in a supporting channel which provides means for adjustably mounting the knife blade.

3. A coulter-knife blade assembly as shown in claim 1 with means attached to the said U-shaped support member to remove the excessive dirt from the coulter surfaces.

4. A coulter-knife blade assembly as shown in claim 3 where the dirt removing means is two adjustable cleaning blades.

5. A coulter-knife blade assembly as shown in claim 1 where adjustable means are provided on the spindle for laterally positioning the coulter.

6. A coulter-knife assembly as shown in claim 1 where the said means for attaching the coulter-knife assembly to the tool bar consists of two plates with bolts for securing the coulter-knife assembly to the tool bar.

7. A coulter-knife blade assembly for applying liquid or gaseous fertilizer into soil surface comprising a coulter, an adjustable knife blade directly behind the coulter and located between substantially parallel plates of a plate frame, means attached to the said knife blade to feed fertilizer into the soil, the said coulter having a means for laterally adjusting the position on a spindle rotatably mounted under a U-shaped member attached to the supporting plate frame, the said supporting plate frame being suspended by a hinged pin and a shearing bolt passing through a pair of substantially parallel plates attached to a tubular swivel mounted on a load bearing plate, the complete assembly being attached to a tool bar by two bolted plates one of which is welded to the top of the tubular swivel.

References Cited by the Examiner

UNITED STATES PATENTS

| | | | |
|---|---|---|---|
| 1,136,172 | 4/1915 | Scott | 111—7 X |
| 2,719,498 | 10/1955 | Goolsby | 111—69 |
| 3,237,577 | 3/1966 | Wilkins | 111—7 |

ANTONIO F. GUIDA, *Acting Primary Examiner.*

ROBERT E. BAGWILL, *Examiner.*